April 28, 1925.                     L. M. DABNEY                    1,535,816
MARKING GAUGE
Filed Oct. 30, 1922
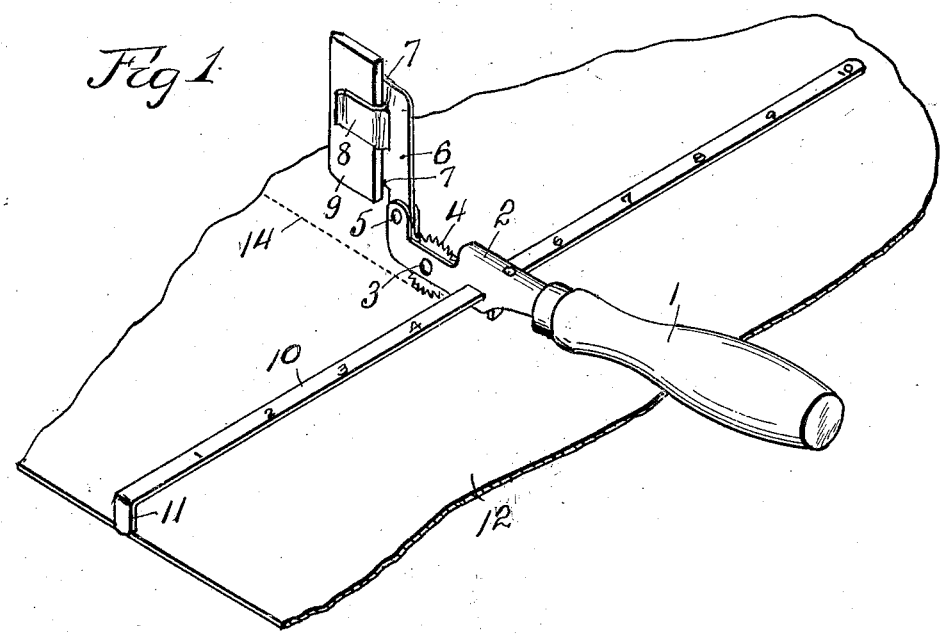
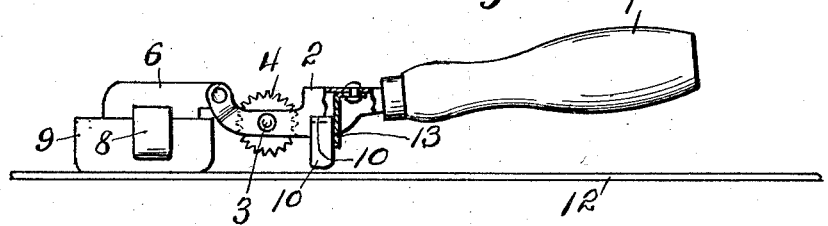
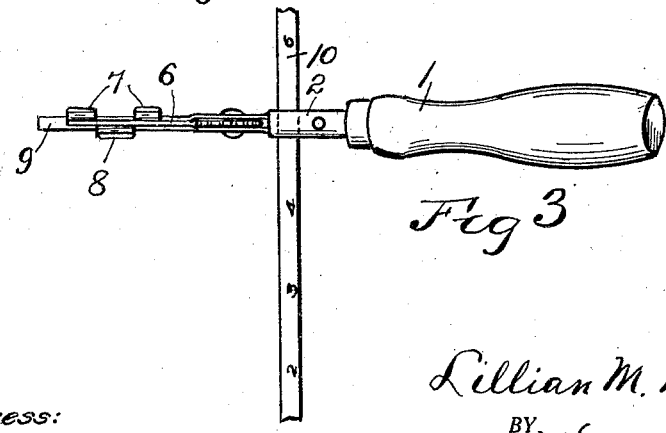
Witness:
R. E. Hamilton
INVENTOR.
Lillian M. Dabney
BY Warren D. House
Her ATTORNEY.

Patented Apr. 28, 1925.

1,535,816

UNITED STATES PATENT OFFICE.

LILLIAN M. DABNEY, OF KANSAS CITY, KANSAS.

MARKING GAUGE.

Application filed October 30, 1922. Serial No. 597,880.

*To all whom it may concern:*

Be it known that I, LILLIAN M. DABNEY, a citizen of the United States, residing at Kansas City, in the county of Wyandotte and State of Kansas, have invented a certain new and useful Improvement in Marking Gauges, of which the following is a specification.

My invention relates to improvements in marking gauges.

One of the objects of my invention is to provide a novel marking gauge having a chalk holder and a toothed marking wheel and arranged so that the wheel or chalk holder may be used separately or together for marking purposes, whereby the gauge is adapted for marking different kinds of goods.

A further object of my invention is to provide a marking gauge of the kind described, which is simple, cheap to make, which may be readily adjusted to suit the different uses for which it may be required, which is durable, and not liable to get out of order, and which may be conveniently operated.

The novel features of my invention are hereinafter fully described and claimed.

In the accompanying drawing, which illustrates the preferred embodiment of my invention, Fig. 1 is a perspective view of my improved marking gauge, with the marking wheel in its operative position and showing the chalk holder removed from its marking position.

Fig. 2 is a side elevation, partly broken away, of the same, the chalk holder being shown in the marking position, and the marking wheel out of the marking position.

Fig. 3 is a plan view of what is shown in Fig. 2, the gauge member being partly broken away.

Similar reference characters designate similar parts in the different views.

My improved marking gauge is provided with a handle having a grip portion 1 and an inverted U-shaped portion 2 between the arms of which on a transverse pin 3 is rotatably mounted a toothed marking wheel 4.

Pivoted to and between the arms of the portion 2 by means of a transverse pin 5 is a chalk holder 6 provided at one side with two chalk holding arms 7 and provided at its other side between the arms 7 with a chalk holding arm 8. 9 designates a piece of chalk, which is held between the arms 7 and 8, and which is of the kind usually employed for marking cloth or similar goods.

10 designates a gauge member, which may be suitably graduated, and which is extended through and is longitudinally adjustable in two transverse holes provided respectively in alinement with each other in the arms of the U-shaped portion 2. If desired, one end of the gauge member 10 may have a right-angled portion 11, adapted to be moved adjacent to one edge of a piece of material 12, which is being marked.

For releasably holding the gauge member 10, in the position to which it may be adjusted, I provide frictional means comprising a right-angled spring 13, Fig. 2, one arm of which is fastened to the portion 2 intermediate of the arms of the latter, and the adjacent arm of which is arranged to bear against one longitudinal edge of the member 10.

The gauge member 10 is adjusted to the position desired. If the marking wheel 4 is to be employed, such as in marking paper, the chalk holder 6 is swung to the upstanding inoperative position, shown in Fig. 1, upon which the marking wheel 4 is employed in the usual maner for marking a line, designated by 14 in Fig. 1.

If the chalk holder is to be used for marking, it is swung to the position shown in Figs. 2 and 3, in which the chalk 9 will rest on the goods 12, while the marking wheel 4 will be held aloof therefrom. If desired, the marking wheel 4 and chalk holder may both be employed simultaneously for double marking a line, by adjusting the holder 6, so that both the chalk and wheel will bear on the goods. The chalk holder 6 is disposed so that the chalk 9 is in longitudinal alinement with the marking wheel 4, whereby but one adjustment of the gauge member 10 is required to adapt the device for marking with either the wheel or the chalk.

I do not limit my invention to the structure shown and described, as many modifications, within the scope of the appended claims, may be made without departing from the spirit of my invention.

What I claim is:—

1. In a marking gauge, a handle, a marking wheel rotatable thereon, and a chalk holder movable on the handle to positions in which the wheel or the chalk holder may be used in operative alinement with each other for marking purposes, substantially as set forth.

2. In a marking gauge, a handle, a marking wheel rotatable thereon, and a chalk holder pivoted on the handle and arranged to be swung to positions in which either the holder or wheel can be used in operative alinement with each other for marking purposes, substantially as set forth.

3. In a marking gauge, a handle, a marking wheel rotatable thereon, a chalk holder movable on the handle to positions in which the wheel or the chalk holder may be used in operative alinement with each other for marking purposes, and a gauge member longitudinally adjustable on the handle transversely thereto, substantially as set forth.

4. In a marking gauge, a handle, a marking wheel rotatable thereon, a chalk holder pivoted to the handle and adjustable thereon to positions in which the holder and wheel may be respectively used in operative alinement with each other for marking purposes, and a gauge member longitudinally adjustable on the handle transversely thereto, substantially as set forth.

5. In a marking gauge, a handle, a marking wheel rotatable thereon, a chalk holder movable on the handle to positions in which the holder and the wheel may be respectively used in operative alinement with each other for marking purposes, a gauge member longitudinally adjustable in the handle transversely thereto, and frictional means provided on the handle for yieldingly holding said member in the position to which it may be adjusted, substantially as set forth.

6. In a marking gauge, a handle having a U-shaped portion, the arms of which are provided respectively with two transverse holes alining with each other, a marking wheel rotatably mounted between the arms of said U-shaped portion, a chalk holder pivoted in operative alinement with the marking wheel between the arms of said portion, and a gauge member extending through and longitudinally adjustable in said holes, substantially as set forth.

7. In a marking gauge, a handle having a U-shaped portion, a marking wheel rotatable between the arms of said portion, and a chalk holder pivoted in operative alinement with the marking wheel between the arms of said portion, substantially as set forth.

8. In a marking gauge, a handle having a U-shaped portion, the arms of which are provided respectively with two transverse holes which aline with each other, a marking wheel rotatable between the arms of said portion, a chalk holder pivoted in operative alinement with the marking wheel to and between said arms, a gauge member extending through and longitudinally adjustable in said holes, and a spring attached to said handle and bearing against said gauge member, substantially as set forth.

In testimony whereof I have signed my name to this specification.

LILLIAN M. DABNEY.